United States Patent Office 2,980,679
Patented Apr. 18, 1961

2,980,679
PROCESS FOR PREPARING HETEROCYCLIC SULFONAMIDES

Gianfranco Pala, Milan, Italy, assignor to Omikron-Gagliardi Societa di Fatto, Milan, Italy, a company of Italy
No Drawing. Filed Mar. 25, 1958, Ser. No. 723,638
Claims priority, application Italy Apr. 4, 1957
7 Claims. (Cl. 260—256.5)

The present invention is related to an improved method of preparing heterocyclic sulfonamides. Particularly, the invention relates to the preparation of sulfohalides which constitute an essential intermediate product from which, by amidation with ammonia, the corresponding heterocyclic sulfonamides are obtained.

These sulfonamides have been prepared heretofore from the corresponding sulfochlorides and sulfobromides which have themselves been prepared by processes based on the oxidative chlorination or bromination in acid aqueous solution of sulphurous intermediates.

With those processes, oxidative halogenation was protracted and the optimum temperatures of the reaction were within somewhat narrow limits. This is because below the lower limits reaction speeds become too low while above the upper limits there occurs a considerable decomposition of the sulphonyl halides already formed.

Moreover, small variations of temperature, of acid concentration and of the operating procedure were sufficient to cause the formation of impure sulphonyl halides which fact notably affected the yields of final products.

Said oxidative halogenation was carried out in acid aqueous solution because it had been found that in plain water the reaction that transforms the heterocyclic sulphur compounds employed as starting materials into the corresponding sulfonyl halides proceeds slowly and with remarkable difficulties. Even after many an hour of treatment with chlorine and bromine the formation of the respective heterocyclic sulfonyl halides will never be satisfactorily completed.

The present invention has as its basic concept the surprising phenomenon that said sulphonyl halides may be rapidly, conveniently and cheaply obtained by oxidative halogenation of the S-bearing intermediate compounds, preferably with chlorine or with bromine, in plain water and in the presence of halogen-carrying catalysts.

Generally stated, all those compounds containing either a real or potential mercapto group in their molecule may also be employed, such as for example, disulphides, thioesters and the like.

More particularly, the invention relates to a process for the preparation of heterocyclic sulfonamides, comprising the steps of reacting a heterocyclic mercapto-compound, containing at least one nitrogen atom as an heteroatom, and having at least one sulfhydrylic function —SH attached to a carbon atom in the heterocyclic ring, in aqueous suspension, with a halogen, at a temperature not higher than 10° C. in the presence of a halogen carrying catalyst, whereby the sulfonyl halide corresponding to said heterocyclic mercapto compound is obtained, and causing the sulfonyl halide thusly obtained, to react with ammonia. The reaction carried out according to the procedure now described proceeds much more conveniently and rapidly than with the processes hitherto known in the art. The procedure according to the invention is very easily carried out and is conducive to improved final yields as compared with the processes of the prior and contemporary art.

Oxidative halogenation in the presence of halogen carrying catalysts could be carried out even in acid aqueous solution and the results are the same obtainable in plane water, whereas the invention affords the advantage of permitting performance of the process without acidifying the reaction medium.

The halides of aluminum, trivalent iron, zinc, tetravalent tin and bismuth have proved particularly useful as halogen-carrier catalysts in the present process. Of these, ferric chloride has proven to be one of the best catalysts.

The process of the invention is illustrated but not limited by the following examples.

EXAMPLE 1

Benzothiazole-2-sulfonamide (chloriding process)

11 grams of finely powdered 2-mercapto-benzothiazole are suspended in 180 ml. of water containing 0.5 gram of stannic chloride. The mixture is energetically stirred and a substantial stream of chlorine is bubbled therethrough for 120 minutes while the temperature is kept below 8° C., and, preferably, at 4–6° C., by means of a cooling bath. Benzothiazole-2-sulfochloride is collected on a funnel equipped with a porous diaphragm, thoroughly washed with iced water and finally subjected to amidation with liquid ammonia. The reaction mixture is allowed to stand for a certain time, after which the ammonia is evaporated, the residue is taken up with diluted ammonia and, after decolorizing with carbon, the sulfonamide is precipitated with hydrochloric acid. The sulfonamide crystallized from ethylene chloride, melts at 177° C.

The yield of crude sulfonamide with respect to the mercapto compound is about 81%.

If the amidation is carried out with 33% aqueous ammonia, the yield is about 58%.

By employing the process suggested by the prior art the yields were 58% with liquid ammonia, and 36% with concentrated aqueous ammonia.

EXAMPLE 2

Benzothiazole-2-sulfonamide (bromiding process)

10 grams of finely powdered 2-mercaptothiazole are suspended in 180 ml. of water containing 0.5 gram of stannic chloride and 4 grams of potassium bromide. The suspension is energetically stirred and 37 grams of liquid bromine are added thereto by increments during about 60 minutes, while keeping the reaction temperature below 8° C. and preferably at 4–6° C. by employing a cooling bath. Then the mixture is again stirred for 30 minutes after which the benzothiazole-2-sulfobromide is collected on a funnel equipped with a porous diaphragm, thoroughly washed with iced water and finally subjected to amidation with liquid ammonia. The operations should be rapidly carried out since the benzothiazole-2-sulfobromide is a very unstable compound and shows a tendency to decomposition with evolution of sulfur-dioxide. The mass is then allowed to stand for a certain period of time, then the ammonia is evaporated, the residue is taken up with diluted ammonia and, after decolorizing with carbon, the sulfonamide is precipitated with hydrochloric acid.

The yield of crude sulfonamide mercapto-compound with respect to the starting obtained by the method now described is about 63%. If the amidation is carried out with 33% aqueous ammonia the yield is about 47% of theory.

Benzothiazole-2-sulfonamide has never been prepared heretofore by oxidative bromiding as this reaction cannot be carried out without employing a suitable catalyst, such as those suggested by the present invention.

EXAMPLE 3

*2 - acetylamino-1,3,4-thiadiazole-5-sulfonamide (chloriding process)*

15 grams of finely powdered 2-acetylamino-1,3,4-thiadiazole-5-mercapto are suspended in 220 ml. of water and to this suspension 0.5 to 1 gram of ferric chloride are added. The mixture is energetically stirred and chlorine bubbled through the suspension. During the bubbling, the temperature of the reaction mixture is controlled by a cooling bath so as to maintain said temperature below 10° C. and preferably at 4–7° C. After 20–25 minutes the reaction is completed. To be sure that the reaction has really been completed chloriding is continued until a strong chlorine excess is obtained in the suspension. The chloriding step takes about 45 minutes altogether. The 2-acetylamino-1,3,4-thiadiazole-5-sulfochloride is collected on a funnel equipped with a porous diaphragm, thoroughly washed with iced water and finally subjected to amidation with liquid ammonia. The reaction mixture is allowed to stand for a certain period of time, after which the ammonia is evaporated, the residue is taken up with diluted aqueous ammonia and, after decolorizing with carbon, the sulfonamide is precipitated with hydrochloric acid.

The yield of crude sulfonamide, obtained with the method now described, with respect to the starting mercapto compound is about 90%. If the amidation is carried out with 33% concentrated ammonia, the yield is slightly reduced.

If the prior art method employing oxidative chlorination in acid aqueous suspension of 2-acetylamino-1,3,4-thiadiazole-5-mercapto had been employed the yield would have been 85%.

The thusly obtained 2-acetylamino-1,3,4-thiadiazole-5-sulfonamide, crystallized from water, melts at 258/259° C. and has chemical and physical constants which coincide those of the compounds having the corresponding formula, as reported in the paper: Pala, G., "Assorbimento nell'ultravioletto e nell'infrarosso della 2-acetilamino-1,3,4-thiadiazole-5-sulfonamide" ("Ultraviolet and infrared absorption of 2-acetylamino-1,3,4-thiadiazole-5-sulfonamide"), published in "Il Farmaco," No. 4, 1956.

EXAMPLE 4

*2-acetylamino-1,3,4-thiadiazole-5-sulfonamide*

22.5 grams of finely powdered 2-acetylamino-1,3,4-thiadiazole-5-benzylmercapto are suspended in 250 ml. water and from 1 to 2 grams of ferric chloride are added to the suspension. The reaction suspension is vigorously stirred and chlorine is bubbled therethrough. During the bubbling the temperature of the reaction mixture is controlled, with the aid of a cooling bath, so as to keep said temperature below 10° C. and preferably in the range 4–7° C. After 20 minutes the reaction is practically completed. The formed 2-acetylamino-1,3,4-thiadiazole-5-sulphochloride is collected on a funnel equipped with a porous diaphragm, thoroughly washed with iced water and eventually subjected to amidation with liquid ammonia.

With the method described above, the yield of crude sulphonamide with respect to the starting merctapto-compound is of about 85%. If the amidation step is effected with 33% aqueous ammonia, the yield is slightly reduced. The prior art method, which employed the oxidative chloriding of 2-acetylamino-1,3,4-thiadiazole-5-benzyl-mercapto, gave a yield of 70%.

EXAMPLE 5

*2-acetylamino-1,3,4-thiadiazole-5-sulfonamide*

15.0 grams of finely powdered bis-(2-acetylamino-1,3,4-thiadiazole)-5,5'-disulphide are suspended in 250 ml. water and from 1 to 2 grams of ferric chloride are added to the suspension.

The mixture is vigorously stirred and chlorine is bubbled therethrough. During bubbling the temperature of the reaction mixture is controlled, with the aid of a cooling bath, so as to maintain said temperature below 10° C. The reaction is virtually completed in 30 minutes.

The formed 2-acetylamino-1,3,4-thiadiazole-5-sulphochloride is collected on a funnel equipped with a porous diaphragm, thoroughly washed with iced water and eventually subjected to amidation with liquid ammonia.

The yield of crude sulphonamide obtained with the method now described is of about 80%. If the amidation step is effected with 33% aqueous ammonia a slightly reduced yield is obtained.

EXAMPLE 6

*2-acetylamino-1,3,4-thiadiazole-5-sulfonamide (bromiding process)*

15 grams of finely powdered 2-acetylamino-1,3,4-thiadiazole-5-mercapto are suspended in 200 ml. of water containing 4 grams of potassium bromide. From 0.5 to 1 gram of ferric chloride are subsequently added. The mass is energetically stirred and 52 grams of liquid bromine are added by increments for about 45 minutes, while keeping the reaction temperature below 10° C., and, preferably, at 4–8° C. by employing a cooling bath. Stirring is continued for a further 10 minutes, then the 2-acetylamino-1,3,4-thiadiazole-5-sulfobromide is collected on a funnel equipped with a porous diaphragm, thoroughly washed with cold water and finally subjected to amidation with liquid ammonia. The reaction mixture is allowed to stand for a certain period, then the ammonia is evaporated, after which the residue is taken up with diluted ammonia and, after decolorizing with carbon, the sulfonamide is precipitated with hydrochloric acid. The yield of crude sulfonamide obtained with the process of the invention, with respect to the starting mercapto compound is about 84%. If the amidation is carried out with 33% aqueous ammonia, the yield is slightly lower.

With the conventional prior art method which used oxidative bromiding in acid aqueous suspension of the 2-acetylamino-1,3,4-thiadiazole-5-mercapto from 5.25 grams starting compound, 2.3 grams of sulfonamide were obtained. The yield was therefore as high as 34.5%.

EXAMPLE 7

*Benzimidazole-2-sulfonamide*

5 grams of finely powdered 2-mercaptobenzimidazole are suspended in 150 ml. of water containing 0.5 gram of ferric chloride.

The mixture is energetically stirred to form a suspension and chlorine is bubbled through said suspension. The temperature of the mixture is kept below 10° C. by employing a cooling bath and, preferably, is maintained within the range 4–6° C. Bubbling is continued for about 40 minutes and, in any case, until the suspension contains a good excess of chlorine. The benzimidazole-2-sulfochloride is collected on a funnel with a porous diaphragm, thoroughly washed with iced water and transformed into the corresponding sulfonamide by means of liquid ammonia. The reaction mixture is allowed to stand for a certain time, after which the ammonia is evaporated, the residue is taken up with diluted ammonia and the solution thusly obtained is decolorized with charcoal. The solution is then slightly acidified with hydrochloric acid and, if needed, is concentrated until complete precipitation of the compound has taken place.

The yield of crude sulfonamide obtained with the method described, with respect to the starting mercapto compound is of about 78%. With the earlier method of oxidative chlorination in acid aqueous solution of 2-mercaptobenzimidazole, the yield was 43%.

The thusly obtained benzimidazole-2-sulfonamide, crystallized from water, melts at 214–215° C.

EXAMPLE 8

1-phenylimidazole-2-sulfonamide 8 grams of finely powdered 2-mercapto-1-phenylimidazole are placed in 130 ml. of water containing 0.5 gram of ferric chloride.

The mixture is stirred and chlorine is bubbled therethrough. The temperature is kept, by means of a cooling bath, below 10° C., and preferably, at 4–6° C. After about 20 minutes, the temperature no longer rises and in the mixture there is an excess of chlorine.

The 1-phenylimidazole-2-sulfochloride is filtered on a funnel equipped with a porous diaphragm, thoroughly washed with iced water, and finally subjected to amidation with liquid ammonia. It is allowed to stand for some time, after which the ammonia is evaporated, the residue is taken up with diluted ammonia and, after decolorizing with charcoal, the solution is neutralized with hydrochloric acid and concentrated until complete precipitation of the sulfonamide has taken place. The yield of crude sulfonamide obtained with the method according to the invention with respect to the starting mercapto compound is of about 88%. With the prior art method of oxidative chlorination in acid aqueous solution of 2-mercapto-1-phenylimidazole, the yield was 74%.

The thusly obtained 1-phenylimidazole-2-sulfonamide, crystallized from water, melts at 170–171° C.

EXAMPLE 9

5-acetylamino-pyridine-2-sulfonamide 10 grams of finely powdered 2-mercapto-5-acetylamino-pyridine are suspended in 140 ml. of water and to the suspension 0.5 gram of ferric chlorine is added. The mixture is energetically stirred and chlorine is bubbled through the suspension. By employing a cooling bath, the temperature of the mixture is controlled so as it remains during the reaction below 10° C. and preferably at 5–7° C. The operation is continued until a large chlorine excess in the mixture is obtained. This operation takes about 60 minutes time. The 5-acetylamino-pyridine-2-sulfochloride is collected on a funnel equipped with a porous diaphragm, thoroughly washed with iced water and finally subjected to amidation with liquid ammonia. The mass is allowed to stand for some time, then the ammonia is evaporated, the residue is taken up with diluted ammonia and, after decolorizing with charcoal, the sulfonamide is precipitated with hydrochloric acid.

The yield of crude sulfonamide with respect to the starting mercapto compound is with this method about 91%. If carrying out the amidation with 33% concentrated ammonia the yield is slightly lower.

With the conventional technique and method of oxidative chlorination in acid aqueous solution of 2-mercapto-5-acetylaminopyridine, the yield was 73%.

The thusly obtained 5-acetylamino-pyridine-2-sulfonamide crystallized from water, melts at 232–233° C.

EXAMPLE 10

4,6-dimethyl-pyrimidine-2-sulfonamide 12 grams of finely powdered 2-mercapto-4,6-dimethylpyrimidine are suspended in 160 ml. of water and to the suspension 0.5–1 g. of ferric chloride is added. The mixture is energetically stirred and chlorine bubbled through the suspension. By means of a cooling bath the temperature of the mixture is kept below 10° C. and preferably at 2–5° C., during the whole operation. The operation is terminated after about 20 minutes, when the temperature no longer rises and a slight excess of chlorine is present in the suspension. The 4,6-dimethylpyrimidine-2-sulfochloride is filtered on a funnel equipped with a porous diaphragm, thoroughly washed with very cold water and finally converted into the corresponding sulfonamide by means of liquid ammonia. The mass is allowed to stand for some time, after which the ammonia is evaporated, the residue is taken up with diluted ammonia and, after decolorizing with charcoal, the solution is slightly acidified with hydrochloric acid. If there is no precipitate, the solution is concentrated until precipitation of the compound has taken place. The yield of crude sulfonamide with respect to the mercapto compound is, by employing the method of this invention, about 63%. With the conventional method of oxidative chlorination in acid aqueous solution of 2-mercapto-4,6-dimethylpyrimidine, the yield was 46%.

The thusly obtained 4,6-dimethylpyrimidine-2-sulfonamide, crystallized from water, melts at 200–210° C.

EXAMPLE 11

Pyrido-(2-1-C)-s-triazole-3-sulfonamide 8 grams of finely powdered 3-mercaptopyrido-2,1-C)-s-triazole are suspended in 180 ml. of water containing 0.5 gram of ferric chloride. The mass is energetically stirred and chlorine is bubbled through the mixture, while the temperature is kept, by means of a cooling bath, at 4–6° C. The operation is continued for 40 minutes, and, at any rate, until the temperature no longer rises and there is good excess of chlorine in the mixture. The pyrido-(2,1-C)-s-triazole-3-sulfochloride is collected on a funnel with porous diaphragm, throughly washed with iced water and transformed into the corresponding sulfonamide with liquid ammonia. The mass is allowed to stand for some time, after which the ammonia is evaporated, the residue is taken up with diluted ammonia and, after decolorizing with charcoal, the sulfonamide is precipitated by making it slightly acidic with hydrochloric acid. The yield of crude sulfonamide with respect to the starting mercapto compound is, when the method according to the invention is adopted, about 57%.

With the conventional method of oxidative chlorination in acid aqueous solution of 3-mercaptopyrido-(2,1-C)-s-triazole, the yield was 36%.

The thusly obtained sulfonamide, crystallized from water, melts at 242–243° C.

EXAMPLE 12

1,2,4-triazole-3-sulfonamide 10 grams of finely powdered 3-mercapto-1,2,4-triazole are placed in 160 ml. of water containing 0.5 gram of ferric chloride.

Chlorine is bubbled through the stirred reaction mixture. The temperature of the reaction mixture is maintained below 10° C., preferably at 4–6° C., by means of a cooling bath. The operation is discontinued when the temperature no longer rises and when there is a good excess of chlorine in the suspension. This takes about 45 minutes. The 1,2,4-triazole-3-sulfochloride is collected on a funnel with a porous diaphragm, thoroughly washed with iced water and finally converted into the corresponding sulfonamide with liquid ammonia. The mass is allowed to evaporate, the residue is taken up with diluted ammonia and, after decolorizing with charcoal, the sulfonamide is precipitated by making it slightly acidic with hydrochloric acid. The yield of crude sulfonamide with respect to the starting mercapto compound is, with this method, about 46%. With the conventional method of oxidative chlorination in acid aqueous solution of 3-mercapto-1,2,4-triazole, the yield was 20%.

The thusly obtained, 1,2,4-triazole-3-sulfonamide, crystallized from water, melts at 224–226° C.

EXAMPLE 13

The procedures described in Examples 1 and 2 are precisely followed, but ferric chloride is used as catalyst. The yields are virtually identical to those of Examples 1 and 2.

EXAMPLE 14

The procedures described in Examples from 1 to 12 are precisely followed, but aluminum chloride is used as catalyst. The yields are virtually identical to those of Examples 1 to 12.

EXAMPLE 15

The halogen-carrying catalyst is, this case, zinc chloride and the amounts used are the same as those used in Examples 1 to 12. By following the procedures of Examples 1 to 12, equally satisfactory results are obtained and the yields are substantially equal to those of Examples 1 to 12.

EXAMPLE 16

Stannic chloride has been used as catalyst and the procedures of Examples 3 to 12 are followed, perfectly analogous results being obtained.

EXAMPLE 17

A process as in Examples 1 to 12 is carried out using bismuth chloride as catalyst. The results obtained are in agreement with those of Examples 1 to 12.

I claim:

1. In the method of preparing heterocyclic sulphonamides having the general formula:

$$R\text{---}SO_2\text{---}NH_2$$

wherein R is a heterocyclic nitrogenous monovalent radical selected from the group consisting of benzothiazole-2-yl
2-acetlyamino-1,3,4-thiadiazole-5-yl
benzimidazole-2-yl
1-phenylimidazole-2-yl
5-acetylamino-pyridine-2-yl
4,6-dimethylpyrimidine-2-yl
pyrido-(2,1,C)-s-triazole-3-yl and
1,2,4-triazole-3-yl comprising the steps of reacting a halogen selected from the group consisting of chlorine and bromine with an aqueous suspension of a heterocyclic nitrogenous mercapto-compound having the general formula:

$$R\text{---}SH$$

wherein R has the same meaning defined above, at a temperature less than about 10° C. and thereafter aminating the resulting sulfonyl halide ($R\text{---}SO_2$-halide) to convert same to the corresponding heterocyclic sulphonamide, the improvement which comprises: carrying out the halogenation reaction in the presence of a halogen-carrier catalyst selected from the group consisting of the halides of aluminium, bismuth, trivalent iron, tetravalent tin and zinc for a time sufficient to form the sulphonyl halide corresponding to said heterocyclic nitrogenous mercaptocompound, whereby the halogenation reaction may be carried out in a non-acidic medium.

2. The method according to claim 1, wherein said catalyst halide is stannic chloride.

3. The method according to claim 1, wherein said catalyst halide is ferric chloride.

4. The method according to claim 1, wherein said catalyst halide is aluminum chloride.

5. The method according to claim 1, wherein said catalyst halide is zinc chloride.

6. The method according to claim 1, wherein said catalyst halide is bismuth chloride.

7. The method according to claim 1 wherein the heterocyclic nitrogenous mercapto-compound is suspended in water.

References Cited in the file of this patent

UNITED STATES PATENTS

| | | |
|---|---|---|
| 2,577,231 | Clapp et al. | Dec. 4, 1951 |
| 2,595,334 | Clapp et al. | May 6, 1952 |

OTHER REFERENCES

Fieser et al.: Organic Chemistry, pages 601–602, second edition (1950).

Roblin et al.: Jour. Amer. Chem. Soc., vol. 72, pages 4890–4892 (1950).

Schmidt: Organic Chemistry, pages 458–459, seventh edition (1955).